F. L. MARSHALL.
TIRE.
APPLICATION FILED MAY 6, 1915. RENEWED JAN. 21, 1922.
1,425,668.
Patented Aug. 15, 1922.
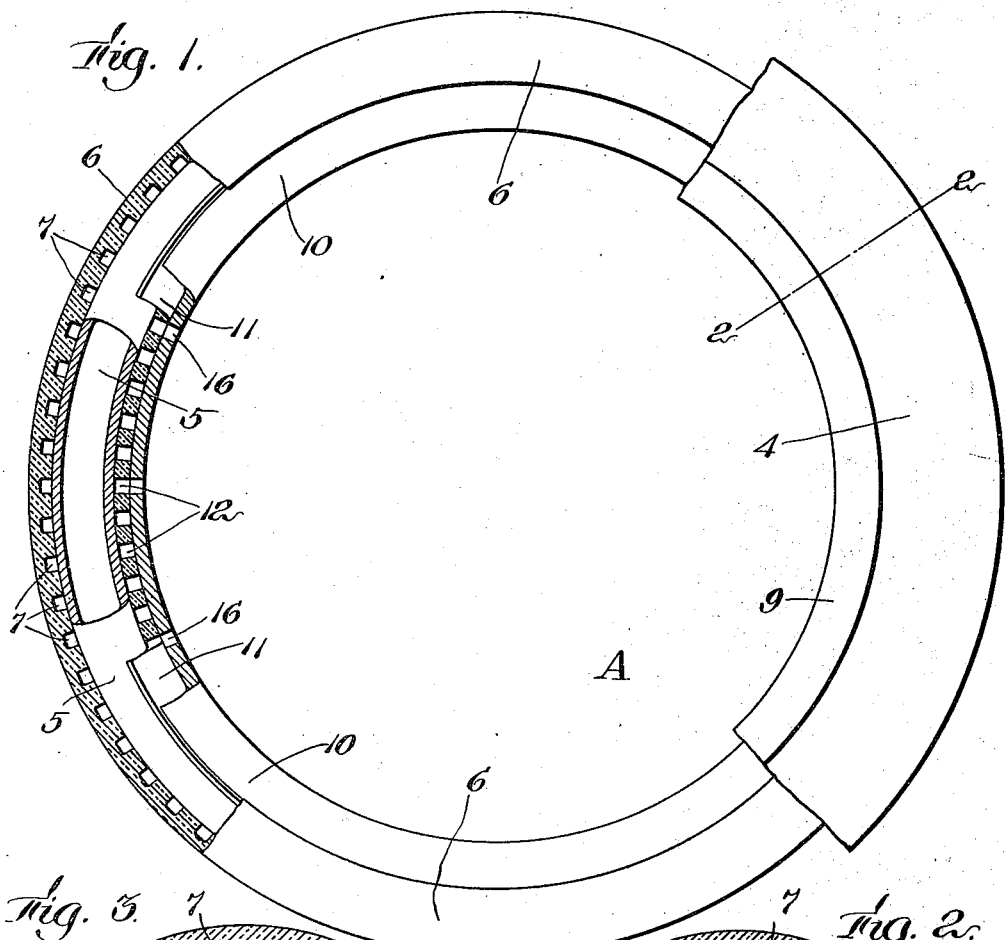
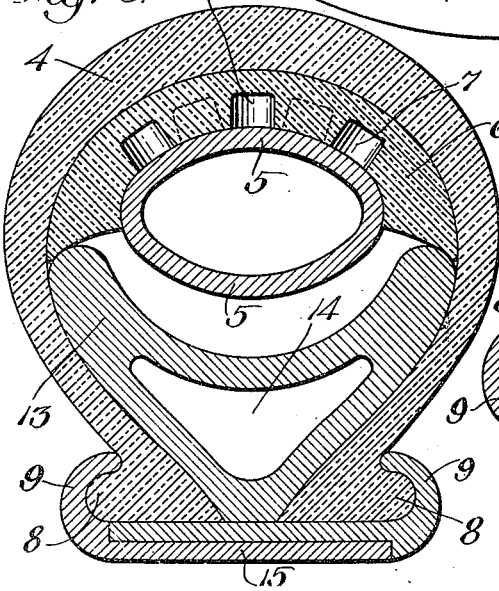
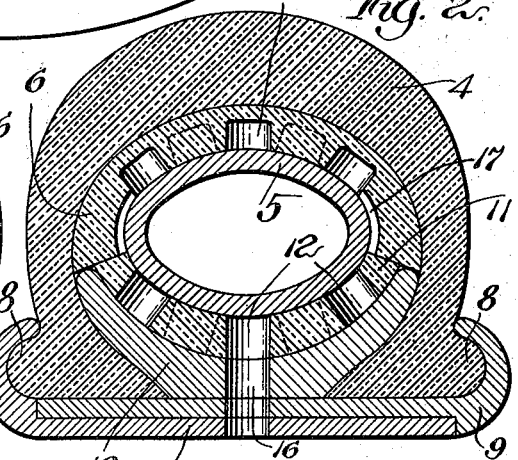
Inventor:
Frank L. Marshall
By Francis J. Dakin Atty

UNITED STATES PATENT OFFICE.

FRANK L. MARSHALL, OF NEWTON CENTER, MASSACHUSETTS.

TIRE.

1,425,668. Specification of Letters Patent. Patented Aug. 15, 1922.

Application filed May 6, 1915, Serial No. 26,404. Renewed January 21, 1922. Serial No. 531,005.

*To all whom it may concern:*

Be it known that I, FRANK L. MARSHALL, a citizen of the United States, residing at Newton Center, in the county of Middlesex and State of Massachusetts, have invented a new and useful Tire, of which the following is a specification, reference being had therein to the accompanying drawings.

This invention relates to vehicle tires in which resilient means are provided for maintaining the shoe in an inflated condition.

The main object of the invention is to secure a tire which is resilient and durable and not affected by punctures.

A further object of the invention is to provide a tire of such form of construction that the outer portion or shoe may be completely worn down without affecting its efficiency.

Another object of the invention is to provide means whereby the strain on that portion of the tire in contact with the ground is distributed throughout its entire circumference.

Other objects of the invention will be more specifically described hereinafter.

Briefly, my invention comprises a tire made up of an outer shoe of ordinary construction, an inner metallic hoop for maintaining the shoe in an inflated condition, and a cushion between the hoop and the inner surface of the shoe.

In the drawings illustrating the preferred embodiment of the invention, Figure 1 is a side elevation of a tire constructed in accordance with my invention, portions of said view being broken away to show the interior construction partly in elevation and partly in section; Fig. 2 is a cross-sectional view on line 2—2 in Figure 1 and Fig. 3 is a cross-sectional view of a modified form of tire.

In the drawings illustrating the preferred embodiment of my invention is shown a tire made up of an outer shoe 4 of well known and ordinary construction, an endless hoop 5 and a cushion 6 interposed between the hoop and the shoe. The hoop 5 is made of metal, preferably tempered steel, and although it may be solid, I prefer to use a hoop which is hollow and elliptical in cross-section as shown in the drawing. The cushion 6 may be made of any resilient material such as rubber or rubber composition and may be solid or provided with a plurality of air cavities 7. The cushion is curved in cross-section so that its outer face corresponds to the curved inner surface of the shoe when inflated and its inner face is provided with a channel to receive the hoop 5. The sides of the cushion partially envelop the sides of the hoop so as to prevent any lateral movement of the same when the tire is in use. Although I have shown the cushion as made separately from the shoe, it may, if desired, be made integral therewith, or the shoe may be provided with a cushion on its inner face.

In order to maintain the lips 8 of the shoe within the flanges 9 of the rim 15 I provide a ring 10 of any suitable non-resilient material having its sides curved upwardly to conform to, and support the inner surfaces of the lips and sides of the shoe. The ring 10 also engages the sides of the cushion 6 and maintains it in a central position with respect to the tread of the shoe.

If desired an additional cushion 11 may be interposed between the ring 10 and the endless hoop 5 and this cushion may also be either solid or provided with a plurality of air cavities 12 similar to the cushion 6. (See Figs. 1 and 2.) In order to permit of a circulation of air through the tire in order to prevent heating, the rim 15 and the ring 10 are pierced by air passages 16 arranged at intervals around the tire and, if desired, the air cavities 7 may be connected to the air cavities 12 by channels 17 cut in the cushion 6 at intervals.

In Figure 3 I have shown a form of tire which is adapted for light vehicles and in which the height of the tire from the rim to the center of the tread is greater than in the tire shown in Figures 1 and 2. In this form the ring 13 of non-resilient material is of different shape in cross-section from the ring 10 shown in Figure 2 and is preferably hollow at 14, with the sides extending upwardly to support the cushion 6. In this form the cushion between the ring 13 and the hoop 5 is omitted.

In the use of my invention it will probably be found necessary to assemble the tire and mount it on the rim by means of special apparatus, because the cushion 6 is first placed in position in the shoe, next the hoop 5, then the cushion 11 and lastly the ring 10 and the lips of the tire are then mounted within the flanges 9 and the two parts of the rim are forced together and locked in position. As thus assembled the shoe is fully inflated and any flattening of the shoe where it engages the pavement is counter-acted by the hoop 5. As the tire tends to flatten at the point where it engages the pavement, the hoop 5 is bent inwardly which forces the top of the hoop up against the cushion in that portion of the tire which is uppermost at the time and the sides of the hoop are forced outwardly against the cushions on the sides of the tire. The result is that any tendency to flatten the hoop and cause it to diverge from a true circle by the weight on the tire is opposed by the cushion between the hoop and the shoe throughout the entire circumference of the shoe. In short the strain placed upon the hoop at the point where the shoe is in contact with the pavement is distributed throughout the entire tire and thereby any substantial flattening of the shoe at the point of contact is prevented. The interposition of the cushion between the shoe and the metallic hoop serves to render the tire resilient, flexible and easy riding and the amount of this resiliency may be regulated by changing the thickness of the cushion. Where the tire is to be used on heavy vehicles it will probably be found of advantage to utilize the inner cushion shown in the construction illustrated in Figures 1 and 2 of the drawings.

It will be noticed that a tire made according to my invention cannot be deflated or affected in any material way by punctures; neither will it be subject to blow outs and these two principal causes of tire trouble are absolutely eradicated. At the same time it may also be noted that the life of the tire is greatly increased because the shoe can be used until the tread is entirely worn down to the cushion.

Another advantage of my tire is that the heating which is noticeable in tires inflated with air is reduced to a minmum and I have found from experience that a tire of my construction can be run continuously for long periods without becoming heated. This feature, of course, adds to the wearing qualities of the tire and prevents disintegration of the rubber.

It will be observed that the main feature of my invention consists in providing resilient means for holding the shoe in a distended position, the means being so constructed that the strain upon the tire is distributed equally throughout the entire circumference.

Although I have described and illustrated one form of my invention I do not wish to be limited to the particular form shown and described because the invention may be embodied in other and different forms without departing from the spirit thereof, and I desire to claim the invention broadly except where limited specifically in the following claims.

What I claim is:—

1. A tire comprising a shoe, a soft resilient cushion within said shoe engaging the inner surface thereof and having a plurality of air cavities and an endless hollow metallic hoop engaging said cushion of substantial thickness to maintain said shoe in a distended condition.

2. A tire having, in combination, a shoe, a hollow endless metallic hoop within said shoe, soft resilient means between said shoe and said hoop, a ring having curved sides for engaging and supporting the lips and sides of the shoe and a cushion interposed between said ring and said hoop.

3. A tire comprising a shoe, a hollow endless hoop within said shoe said hoop being entirely surrounded by soft resilient means whereby any pressure exerted on said shoe is, through the medium of said resilient means, distributed throughout the shoe.

4. The combination of a wheel rim, a shoe on said rim, a hollow endles hoop within said shoe, a soft resilient cushion between said shoe and said hoop and a second soft resilient cushion between said hoop and said rim.

5. The combination of a wheel rim, a shoe on said rim, a hollow endless hoop within said shoe, a soft resilient cushion between said shoe and said hoop and a second soft resilient cushion having air cavities, between said hoop and said wheel rim.

6. The combination of a wheel rim, a shoe on said rim, a hollow endless hoop within said shoe, a soft resilient cushion having air cavities and grooves adapted to prevent heating, said cushion being placed between said shoe and said hoop, and a second cushion, said second cushion being placed between said hoop and said rim.

7. A tire comprising a shoe, a hollow endless metallic hoop within said shoe, a curved resilient member adapted to engage the inner surface of said shoe and the other periphery of said hoop, a second resilient member curved in the opposite direction from said first resilient member and adapted to engage the outer surface of said hoop around its inner periphery.

8. A tire comprising a shoe, an endless hoop within said shoe and soft resilient means entirely surrounding said hoop and engaging the inner surface of said shoe whereby any pressure exerted on said shoe is, through the medium of said resilient means, distributed throughout the shoe; said resilient means being provided with air cavities to reduce heating.

9. A tire comprising a shoe, an endless hoop within said shoe, soft resilient means entirely surrounding said hoop whereby any pressure exerted on said shoe is, through the medium of said resilient means, distributed throughout the shoe, said resilient means being provided with air cavities to prevent heating, and one or more passages connecting said air cavities to the outside atmosphere.

In testimony whereof, I hereunto set my hand in the presence of two subscribing witnesses, this the fifth day of May, 1915.

FRANK L. MARSHALL.

Witnesses:
F. J. V. DAKIN,
E. F. UNIAC.